UNITED STATES PATENT OFFICE.

WILLIAM A. FAIRBURN, OF SHORT HILLS, NEW JERSEY, AND FREDERICK V. D. CRUSER AND WILLIAM GREEN, OF BARBERTON, OHIO, ASSIGNORS TO THE DIAMOND MATCH COMPANY, OF CHICAGO, ILLINOIS, A CORPORATION OF ILLINOIS.

ART OF TREATING MATCH-SPLINTS.

13,636. Specification of Reissued Letters Patent. Reissued Oct. 28, 1913.

No Drawing. Original No. 1,044,154, dated November 12, 1912, Serial No. 676,896. Application for reissue filed November 22, 1912. Serial No. 733,017.

*To all whom it may concern:*

Be it known that we, WILLIAM A. FAIRBURN, a resident of Short Hills, in the county of Essex and State of New Jersey, formerly of Barberton, in the county of Summit and State of Ohio, and FREDERICK V. D. CRUSER and WILLIAM GREEN, both residents of said Barberton, and all citizens of the United States, have invented certain new and useful Improvements in the Art of Treating Match-Splints, of which the following is a specification.

This invention relates to an improvement in the art of treating match splints, and particularly concerns a process whereby the splints have incorporated therewith an unctuous vehicle for the efficient transmission of the flame from the igniting material to the body of the splints, and whereby the splints are impregnated with materials which prevent the glowing of the splints after the flame has been extinguished.

As heretofore generally practised the burning and non-glowing characteristics of match splints have been attained by subjecting the splints to the three-fold operation of (1) impregnating the splints with an aqueous solution of a suitable chemical or chemicals; (2) drying the splints, and (3) dipping them in a bath of paraffin or other suitable unctuous substance. The last named step is technically known as "paraffining", and for the sake of brevity we shall herein use that term in the same comprehensive sense.

In Letters Patent of the United States No. 1,044,153, dated November 12, 1912, we disclose, among other things, a process of impregnating and paraffining match splints, wherein the splints are first subjected to an impregnating bath, and then to the action of a bath of liquid paraffin, or the like, which is maintained at a temperature sufficient to expel the solvent from the splints in the form of steam or vapor; the splints thus being effectually dried without deteriorating or lessening the efficacy of the non-glowing chemicals with which they are impregnated, and such splints at the same time absorbing sufficient paraffin to facilitate the burning of the splints.

It is the object of our present invention to effect the impregnating and paraffining of the match splints in a single operation.

In carrying out our invention in a simple and efficient manner we subject the splints to the action of a bath wherein impregnating materials in a very finely divided condition are kept in suspension in the presence of an unctuous substance which is maintained at a sufficiently high temperature to insure impregnation of the splints. Thus, for example, we heat paraffin to a temperature over 212° and preferably from 300° to 320°, Fahr., more or less, and add thereto and keep in suspension therein very finely divided boracic acid and alum.

The match splints are immersed in the hot mixture for a sufficiently long time to effect the impregnation of the splints with the powdered substance, the period of immersion being a variable one depending upon the nature and condition of the splint material.

The suspension of the powdered substance may be effected by mechanical agitation of the bath or by chemical disintegration of such substance therein; and in the former case we find it advantageous to dissolve in the paraffin, or other unctuous substance, a soap or soaps produced by the combination of a metallic oxid with a fatty anhydrid. This added material not only contributes directly to the impregnation of the splints, but it aids in the suspension of the impregnating powder in the solution. Good results are secured by dissolving in the paraffin kept at or about the temperature above mentioned aluminum stearate or calcium stearate in the proportion, in each instance, of about 7% stearate and 93% paraffin.

It is to be understood that in pursuance of our invention we may employ any suitable unctuous bath, and we may employ any finely divided impregnating material which can be kept in suspension by agitation or disintegration.

We claim—

1. The improvement in the art of treating match splints, which consists in subjecting them to the action of a mixture comprising an unctuous material which imparts an inflammable property to the splints and an impregnating substance which imparts a non-glowing property to the splints.

2. The improvement in the art of treating match splints, which consists in subjecting them to the action of a mixture comprising melted paraffin with which is incorporated an impregnating substance which imparts a non-glowing property to the splints.

3. The improvement in the art of treating match splints to render them non-glowing, which consists in providing a bath of unctuous material which will serve as a vehicle for the efficient transmission of the flame from the igniting material to the body of the splints, adding to the bath a non-glowing powdered substance which will effect impregnation of the splints, maintaining said substance in suspension, and dipping or immersing the splints in the bath.

4. The improvement in the art of treating match splints to render them non-glowing, which consists in providing a bath of paraffin, adding thereto a non-glowing powdered substance which will effect impregnation of the splints, maintaining said substance in suspension, and dipping or immersing the splints in the bath.

5. The improvement in the art of treating match splints to render them non-glowing, which consists in heating unctuous material to a temperature over 212° Fahr., dissolving therein a soap comprising the combination of a metallic oxid with a fatty anhydrid, adding to the solution a non-glowing powdered substance which will effect impregnation of the splints, agitating the solution to keep such substance in suspension, and dipping or immersing the splints in the bath.

WILLIAM A. FAIRBURN.
FREDERICK V. D. CRUSER.
WILLIAM GREEN.

Witnesses to signature of William A. Fairburn:

MARTHA M. WOODLAND,
FRANCES R. GRIFFIN.

Witnesses to signatures of Frederick V. D. Cruser and William Green:

V. A. JOHNSTON,
E. A. JACOBS.